United States Patent
Yang

(10) Patent No.: US 10,455,000 B2
(45) Date of Patent: Oct. 22, 2019

(54) METHOD FOR EXECUTING REMOTE APPLICATION IN LOCAL DEVICE

(71) Applicant: Hyundai Motor Company, Seoul (KR)

(72) Inventor: Woo Sok Yang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 399 days.

(21) Appl. No.: 14/510,486

(22) Filed: Oct. 9, 2014

(65) Prior Publication Data
US 2015/0180952 A1 Jun. 25, 2015

(30) Foreign Application Priority Data
Dec. 24, 2013 (KR) .................. 10-2013-0162018

(51) Int. Cl.
*H04L 29/08* (2006.01)
*H04W 4/04* (2009.01)
(Continued)

(52) U.S. Cl.
CPC .............. *H04L 67/10* (2013.01); *B60K 35/00* (2013.01); *B60K 37/06* (2013.01); *G06F 9/547* (2013.01); *H04L 67/02* (2013.01); *H04L 67/1095* (2013.01); *H04M 1/7253* (2013.01); *H04W 4/046* (2013.01); *B60K 2370/55* (2019.05); *B60K 2370/573* (2019.05); *B60K 2370/577* (2019.05); *B60K 2370/589* (2019.05); *H04L 67/12* (2013.01); *H04M 1/6083* (2013.01); *H04M 2250/16* (2013.01)

(58) Field of Classification Search
CPC ..... H04L 67/10; H04L 67/2823; H04W 4/003
See application file for complete search history.

(56) References Cited

U.S. PATENT DOCUMENTS

| 5,276,883 A | * | 1/1994 | Halliwell | .............. | G06F 3/0481 |
| | | | | | 709/203 |
| 2012/0244876 A1 | * | 9/2012 | Park | ...................... | G06F 3/0489 |
| | | | | | 455/456.1 |

(Continued)

FOREIGN PATENT DOCUMENTS

| JP | 2012149998 A | 8/2012 |
| JP | 2012247898 A | 12/2012 |

(Continued)

*Primary Examiner* — Moustafa M Meky
*Assistant Examiner* — Sm Z Islam
(74) *Attorney, Agent, or Firm* — Mintz Levin Cohn Ferris Glovsky and Popeo, P.C.; Peter F. Corless

(57) ABSTRACT

In the present disclosure, a remote device is connected to a local device in a vehicle so as to be communicable with each other. Information of a remote app installed in the remote device is transmitted from the remote device to the local device. The information of the remote app received from the remote device is displayed together with information on a local app installed in the local device on a screen of a user interface (UI) via a display device of the local device. When a user executes the remote app, using the information of the remote app displayed in the display device of the local device, the remote app is executed on the remote device, and an execution screen of the remote app transmitted from the remote device to the local device is simultaneously displayed via the display device of the local device.

8 Claims, 2 Drawing Sheets a) Local screen
(execution screen of remote app)

b) Local screen (home screen)

(51) Int. Cl.
*H04M 1/725* (2006.01)
*G06F 9/54* (2006.01)
*B60K 35/00* (2006.01)
*B60K 37/06* (2006.01)
*H04M 1/60* (2006.01)

(56) References Cited

U.S. PATENT DOCUMENTS

2013/0307872 A1\* 11/2013 Aleksandrov ........... G06F 3/147
                                                    345/629
2014/0162623 A1\* 6/2014 Nagai ................. H04M 1/7253
                                                    455/419

FOREIGN PATENT DOCUMENTS

| JP | 2013171514 A | 9/2013 |
| JP | 2013235438 A | 11/2013 |
| KR | 10-1017866 B1 | 3/2011 |
| KR | 10-2011-0093541 A | 8/2011 |
| KR | 10-2012-0057800 A | 6/2012 |
| KR | 10-1330826 B1 | 11/2013 |

\* cited by examiner a) Local screen b) Mirroring initial screen
– screen before execution of remote app c) Mirroring screen
– screen after execution of app a) Local screen
(display screen of vehicle terminal)

b) Local screen (home screen)

METHOD FOR EXECUTING REMOTE APPLICATION IN LOCAL DEVICE

CROSS-REFERENCE TO RELATED APPLICATION

This application claims under 35 U.S.C. § 119(a) the benefit of Korean Patent Application No. 10-2013-0162018 filed on Dec. 24, 2013, the entire contents of which are incorporated herein by reference.

BACKGROUND (a) Technical Field

The present disclosure relates to a method for executing a remote application in a local device. More particularly, the present disclosure relates to a method for enabling switching and execution between a local application (e.g., "app") installed in a local device and a remote app installed in a remote device to be more conveniently and simply performed on a screen of the local device.

(b) Background Art

Currently, the development of information and communication technologies promotes the development of cars that are increasingly comfortable and convenient by providing drivers with various information. As is well known, various convenience-enhancing devices can be mounted in a vehicle, including an audio/video system, a navigation system for providing map and traffic information, and the like.

In particular, audio/video & navigation (AVN) systems, which display various kinds of information required by a driver through a display device while outputting audio in the vehicle, have been integrated in vehicles. Like smart devices (e.g., a smart phone and the like), vehicle terminals, such as a head unit of the AVN system, are being developed as a device capable of using various functions by executing an app downloaded and installed through an app (e.g., application software) installed in the delivery of a vehicle or communication. In addition, a display device, such as a touch screen through which input and output are possible, has been applied as a display device of the vehicle terminal.

Meanwhile, techniques have been developed which enable various functions to be performed by connecting a smart device to a vehicle. As an example, there are mirroring techniques between a smart device and a vehicle terminal, in which a smart device is connected to a vehicle (e.g., using Bluetooth), and a display screen of the smart device is displayed as it is through a display device of the vehicle. That is, if a mirroring app is executed on a screen (e.g., local screen) of a vehicle terminal (e.g., local device) after a smart device (e.g., remote device) is connected to a vehicle, a screen (e.g., remote screen) of the smart device is identically displayed by a display device of the vehicle.

In this case, if an app (e.g., remote app) of the smart device is executed on a screen (e.g., mirroring screen) displayed by the display device of the vehicle, the execution screen of the app is displayed by the display device. As such, the display device of the vehicle displays not only the app of the vehicle terminal, but also the app executed in the smart device.

However, conventionally, a screen of the vehicle terminal switches to a mirroring screen by executing a mirroring app in the vehicle terminal for the purpose of mirroring of the smart device, and an app on the remote screen, i.e., an app of the smart device, could then be executed. In addition, a separate manipulation (e.g., a manipulation for mirroring and its cancellation, etc.) is required in order to perform switching between an app of the vehicle terminal and an app of the smart device.

FIG. 1 is a view showing screens of a display device of a vehicle, which illustrates a conventional method for executing an app of a smart device in the display device of the vehicle. As shown in this figure, if a mirroring app is executed on a local screen (e.g., screen in FIG. 1(a)) displayed by the display device of the vehicle, i.e., a user interface (UI) provided by a vehicle terminal, display information of a smart device is displayed on the same screen (e.g., mirroring screen) in the display device of the vehicle (see FIG. 1(b)). Subsequently, if a map app is executed on the mirroring screen in the display device of the vehicle, the screen of the map app provided in the smart device is displayed as it is through the display device so that map information is provided to a driver (see FIG. 1(c)).

More specifically, in order to execute an app installed in the vehicle terminal, the user uses a UI screen that the vehicle terminal provides through the display device as it is. If the smart device is connected to the vehicle terminal, a display screen of the smart device is displayed as it is through the display device of the vehicle by executing the mirroring app. In this case, the display device receives and displays the same screen as the display screen of the smart device, i.e., a UI screen provided from an operating system (OS) of the smart device. Therefore, in order to execute an app of the smart device while an app of the vehicle terminal is being used, the screen of the smart device should be displayed by the display device of the vehicle through mirroring by performing a separate manipulation (e.g., execution of the mirroring app, etc.) in a state in which the UI screen of the vehicle terminal is displayed.

In the conventional method, in order to execute a remote app of the smart device (e.g., remote device) while a local app is being executed using the UI screen of the vehicle terminal (e.g., local device), the remote app should be executed after the display screen of the display device of the vehicle is switched to the display screen of the smart device. Therefore, there is an inconvenience in that an app must be selected after switching between devices is complete so as to perform switching between apps.

Most smart devices using a self OS (e.g., iOS, OS for Android phones, and the like) provide a UI for executing and switching apps, and the UI enables an app to be immediately executed on a home screen or enables switching between apps executed in a background by pressing a menu key, for example. However, such a technique is considered with respect to only the local app (e.g., app installed in the smart device itself), and is not considered with respect to execution of and switching between apps of the smart device and another remote device connected thereto.

In most current remote apps and mirroring techniques, after a remote screen of a remote device is displayed on a mirroring screen of the local display device (e.g., a display device of a vehicle), an app (e.g., remote app) of the remote device displayed by the local display device is executed, or switching between apps occurs. However, there is no solution for allowing switching between apps of a local device and a remote device through a minimum amount of manipulation. Accordingly, in the conventional method, in order to execute an app installed in the smart device after a local app is executed through a self UI in the vehicle terminal, a UI (e.g., remote screen) of the smart device is displayed by the display device of the vehicle through the aforementioned mirroring techniques, and a remote app (e.g., an app installed in the smart device and displayed in the display device of the vehicle) is then executed at a lower end of the mirroring screen.

On the other hand, in order to re-execute the local app of the vehicle terminal, the mirroring can be cancelled through a separate manipulation, and the local app is executed through the UI displayed in the vehicle terminal. As a result, it is necessary to perform a manipulation for allowing self UI screens of the vehicle terminal (e.g., local device) and the smart device (e.g., remote device) to be displayed by the display device for the purpose of switching between apps of the vehicle terminal and the smart device, and therefore, there is an inconvenience when switching between the apps of the vehicle terminal and the smart device.

SUMMARY OF THE DISCLOSURE

The present disclosure provides a method for enabling switching and execution between a local application (e.g., app) installed in a local device and a remote app installed in a remote device to be more conveniently and simply performed on a screen of the local device.

In one aspect, the present disclosure provides a method for executing a remote app in a local device, the method including: connecting a remote device to a local device in a vehicle to be communicable with each other; transmitting information on a remote app installed in the remote device from the remote device to the local device; displaying the information on the remote app received from the remote device together with information on a local app installed in the local device on a screen of a user interface (UI) in a display device of the local device; and executing the remote app in the remote device and simultaneously displaying an execution screen of the remote app transmitted from the remote device to the local device in the display device of the local device, when a user executes the remote app, using the information on the remote app displayed in the display device of the local device.

In an exemplary embodiment, when the local app and the remote app are currently being executed in a multitasking state, the local device may allow for a reduced execution screen of the local app and the remote app, or for information on the local app and the remote app to be provided and displayed as a separate screen of a multitasking switching UI on the screen of the UI. When the user selects any one of the apps currently being executed, which are displayed on the screen of the multitasking switching UI, the local device may allow for an execution screen of the selected app to be magnified and displayed by the display device of the local device.

In another exemplary embodiment, the information on the remote app or the information on the local app may be an execution icon for executing a corresponding app.

In still another exemplary embodiment, the local device may process an execution icon of the remote app and display the processed execution icon in the display device of the local device so that the user identifies the execution icon of the remote app received from the remote device from that of the local app.

In yet another exemplary embodiment, the local device may display the execution icon of the remote app received from the remote device in the display device by changing the shape or color of the execution icon of the remote app or forming a frame around the execution icon of the remote app.

In still yet another exemplary embodiment, the local device may display the execution icon of the remote app in a predetermined region on the screen of the UI of the local device so that the user identifies the execution icon of the remote app received from the remote device from that of the local app.

In a further exemplary embodiment, the local device may be a vehicle terminal mounted in the vehicle, and the remote device may be a smart device in the vehicle.

According to the present disclosure, when the smart device (e.g., remote device) is connected to the vehicle, icons of a remote app installed in the smart device are automatically displayed by the display device of the vehicle terminal (e.g., local device), and the remote app currently being executed and the local app of the vehicle terminal are displayed through a separate multitasking switching UI, so that it is possible to conveniently and simply perform execution of the remote app, switching between the remote app and the local app, and the like. Further, since information on the remote app is displayed by the display device of the vehicle terminal, the remote app can be executed in the same manner as the local app, and thus it is possible to provide availability and convenience as if one device was used on one screen.

The above and other features of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

Figure 1:
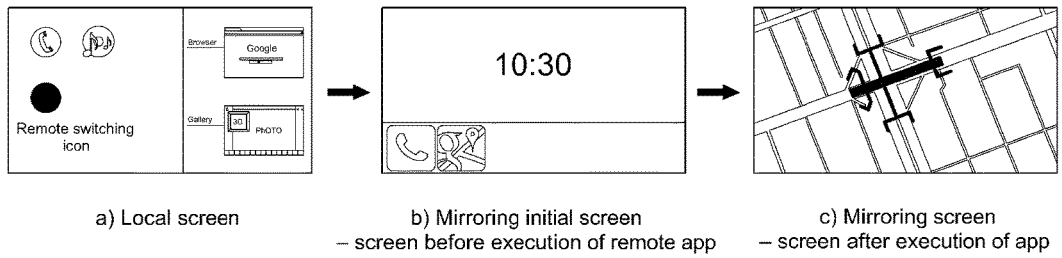
FIG. 1 is a view illustrating a conventional method for executing an application (app) of a smart device in a display device of a vehicle.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment. In the figures, reference numbers refer to the same or equivalent parts of the present disclosure throughout the several figures of the drawing.

DETAILED DESCRIPTION OF THE EMBODIMENTS

Hereinafter reference will now be made in detail to various embodiments of the present disclosure, examples of which are illustrated in the accompanying drawings and described below. While the contents of the disclosure are described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Additionally, it is understood that the below methods may be executed by at least one controller. The term "controller" refers to a hardware device that includes a memory and a processor. The memory is configured to store program instructions, and the processor is configured to execute the program instructions to perform one or more processes which are described further below.

The present disclosure provides a method for conveniently and simply switching and execution between a local application (e.g., app) installed in a local device and a remote app installed in a remote device performed on a screen of the local device. To this end, the present disclosure provides a method for immediately executing and switching a local app and a remote app on a local screen. If a remote device is connected to a local device, the local device displays icons of the remote app and simultaneously displays a multitasking switching user interface (UI) for selection and switching between the local app and the remote app, which are currently being executed in a multitasking state.

For the purposes of the present disclosure, the local device may be a vehicle terminal having a display device, and the remote device may be a smart device connected so that a screen of the remote device is displayed through the display device of the local device (e.g., vehicle terminal). Further, the local screen may be a screen that the display device of the local device is currently displaying, and it should be understood that the local screen is distinguished from a screen, i.e., a remote screen, that a display device of the smart device is currently displaying. In addition, the local app may be an app (e.g., application software) installed and executed in the local device, and the remote app may be an app installed and executed in the remote device.

Figure 2:
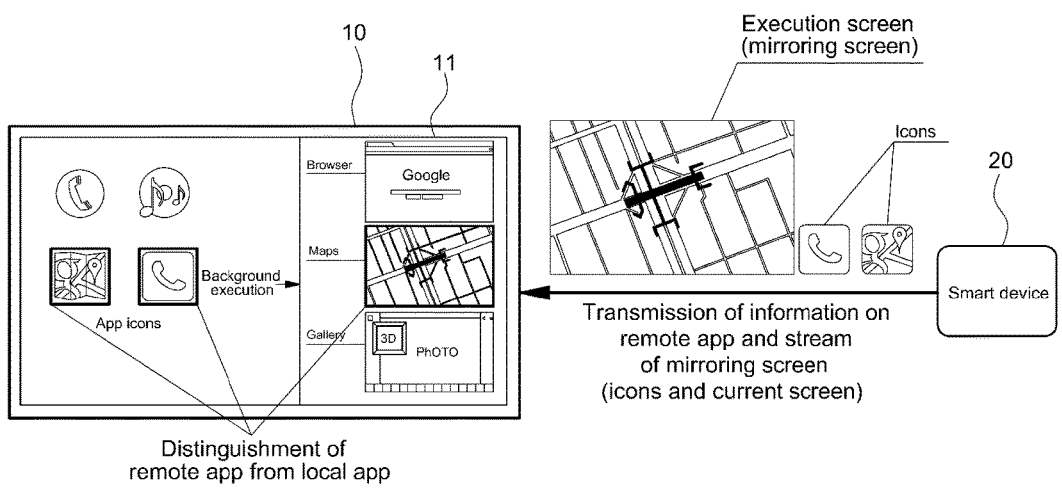
FIG. 2 is a view showing a connection state between a vehicle terminal that is a local device and a smart device that is a remote device according to an embodiment of the present disclosure.

FIG. 2 is a view showing a connection state between a vehicle terminal 10 that is a local device and a smart device (e.g., smart phone or the like) 20 that is a remote device according to an embodiment of the present disclosure, which simultaneously shows a local screen displayed by a display device 11 of the vehicle terminal 10. First, if the smart device 20 is connected to a vehicle to be communicable with each other (e.g., through a USB or the like), the smart device (e.g., remote device) 20 may be executed through a manipulation in the vehicle terminal (e.g., local device) 10 and may transmit, to the vehicle terminal 10, information on a remote app capable of providing a screen of the executed smart device 20 through mirroring. Conversely, the vehicle terminal 10 may transmit information used in app switching to the smart device 20 so that the transmitted information is selected in the smart device 20. The information on the remote app may be information including, for example, execution icons of the remote app, an app name, and the like.

Subsequently, the vehicle terminal 10 processes the information on the remote app transmitted from the smart device 20 and displays the processed information through the display device 11. For example, the shape, color, frame, and the like of an execution icon of the transmitted remote app are changed so that the icon can be distinguished from an execution icon of a local app installed in the vehicle terminal itself, and then displayed on a screen (e.g., local screen) of the display device 11.

In addition, the execution icon of the remote app may be disposed in a separately defined region on the screen of the display device 11 so that the execution icon of the remote app can be distinguished from execution icons of the local app without processing the execution icon of the remote app. As such, the shape, color, frame, and the like of an execution icon of the remote app are changed so that the execution icons of the remote app can be distinguished from the execution icon of the local app, or the execution icon of the remote app is displayed in another region on the screen of the display device 11, so that the existing local apps and the remote app have the same availability.

Figure 3:
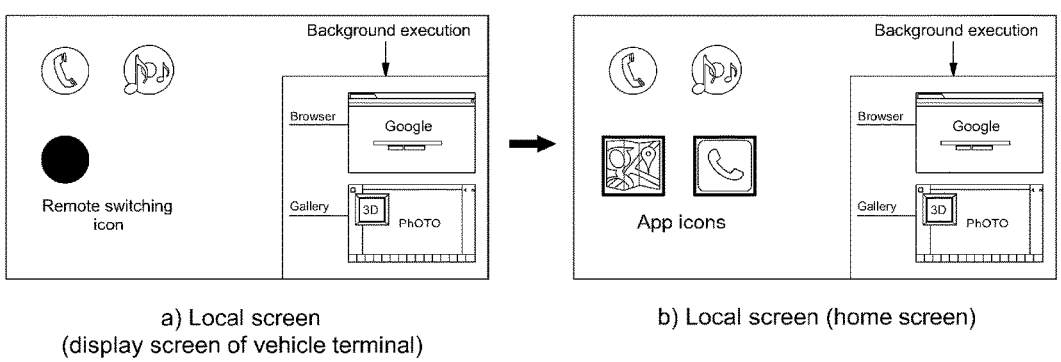
FIG. 3 is a view showing screens before and after the connection of the smart device, which are displayed in a display device of the vehicle terminal according to an embodiment of the present disclosure.

FIG. 3 is a view showing screens (e.g., local screens) before and after the connection of the smart device (e.g., remote device), which are displayed in the display device of the vehicle terminal (e.g., local device) according to the embodiment of the present disclosure. FIG. 3(a) shows a home screen before the smart device (e.g., remote device) is connected to the vehicle, and FIG. 3(b) shows a home screen on which execution icons of the remote app are displayed in the state in which the smart device is connected to the vehicle.

Figure 4:
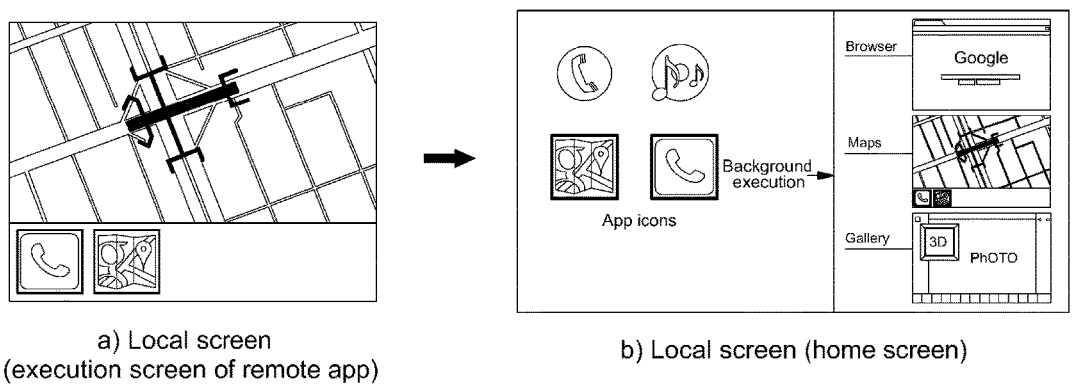
FIG. 4 is a view showing screens displayed in the display device of the vehicle terminal after a remote app is executed.

FIG. 4 is a view showing screens (e.g., local screens) displayed in the display device of the vehicle terminal (e.g., local device) after the remote app is executed. FIG. 4(a) shows a screen (e.g., execution screen of a map app) displayed after the remote app is executed, and FIG. 4(b) shows a home screen switched while the remote app is being executed.

As shown in FIGS. 3 and 4(b), if the smart device is connected, apps of the smart device, which can be manipulated and executed in the vehicle terminal, i.e., execution icons that are the processed information of the remote app, are displayed in the display device of the vehicle terminal so as to be distinguished from local apps (distinguished by surrounding frames of the execution icons with a bold line). The vehicle terminal provides a multitasking switching UI for displaying a local app currently being executed and a reduced execution screen of the remote app or an icon that is information on the app being executed, as display information displayed together with the processed information (e.g., execution icon) of the remote app. The screen of the multitasking switching UI is displayed at one side of a home screen on which execution icons of executable apps (e.g., the local app before the smart device is connected, and the local app and the remote app after the smart device is connected) are displayed (see FIGS. 3 and 4(b)).

Referring to FIGS. 3 and 4(b), the execution icons of the executable app are disposed at a left side of the home screen, and the multitasking switching UI is disposed at a right side of the home screen. The execution screens of the app currently being executed are displayed in a reduced form in the multitasking switching UI. In this case, as described above, information on the app currently being executed (e.g., background execution app), such as icons, for example, may be displayed in the multitasking switching UI, rather than the reduced screens. As a result, if a user presses and selects one of the execution icons (e.g., icons displayed on the home screen of FIG. 3(b)) of the remote app, which are processed in the vehicle terminal and displayed in the display device of the vehicle terminal, the selected remote app is immediately executed. After the remote app is executed, the screen (e.g., local screen) of the display device is switched to a screen (e.g., remote screen) of the smart device, as shown in FIG. 4(a).

In this case, like the conventional method, the local screen displayed in the display device of the vehicle terminal is a mirroring screen identical to the screen displayed in the smart device after the remote app is executed. The vehicle terminal receives an execution screen of the remote app transmitted from the smart device after the remote app is executed, and displays the received execution screen through the display device as shown in FIG. 4(a). The vehicle terminal may allow the execution screen of the remote app transmitted from the smart device to be displayed as a mirroring screen identical to the screen of the smart device in the display device without processing the execution screen of the remote app. However, the vehicle terminal may allow the execution screen of the remote app to be changed in a UI form suitable to be used in the display device by appropriately processing the mirroring screen and then displayed in the display device.

When the user touches the execution screen of the remote app on the local screen or touches a separate button, the local screen is again switched to the home screen shown in FIG. 4(b). In this case, the remote app being executed is additionally displayed on the screen of the multitasking switching UI. The execution screen of the remote app being executed may be displayed on the screen of the multitasking switching UI as shown in FIG. 4(b), or only the icon of the remote app being executed may be displayed on the screen of the multitasking switching UI. In this case, the local app and the remote app are displayed together on the screen of the multitasking switching UI, and thus, the execution screen or execution icon of the remote app is displayed in a state in which it is appropriately processed so that the remote app and the local app can be distinguished from each other. Here, the remote app may be distinguished from the local app by changing the frame of the screen as shown in FIG. 4(b). In addition, the screen of a current stream or previous stream transmitted from the smart device may be stored and then used as the execution screen of the remote app on the screen of the multitasking switching UI.

Referring to FIG. 4(b), execution screens of the local app are displayed together with the remote app. Hence, if the user selects a desired app (either the local app or the remote app), the execution screen of the selected app can again be magnified and displayed as shown in FIG. 4(a).

FIGS. 3 and 4 illustrate an example case where a map app is executed. Hence, if the user clicks a map icon of FIG. 3(b), which is an execution icon of the remote app, a map app of the smart device is executed, and an execution screen of the map app is transmitted to the vehicle terminal. Thus, the transmitted execution screen of the map app is displayed through the display device, as shown in FIG. 4(a).

Subsequently, if the user touches the execution screen of the map app, the execution screen switches to the home screen shown in FIG. 4(b). In this case, the execution screen of the map app being executed is additionally displayed in the multitasking switching UI of the home screen. Subsequently, if the user selects another app in the multitasking switching UI, an actual execution screen of the selected app is magnified and displayed. If the user executes a new app by pressing another execution icon on the home screen shown in FIG. 4(b), an execution screen of the new app being executed is displayed through the display device in the same manner.

The contents of the present disclosure have been described in detail with reference to exemplary embodiments thereof. However, it will be appreciated by those skilled in the art that changes may be made in these embodiments without departing from the principles and spirit of the disclosure, the scope of which is defined in the appended claims and their equivalents.

What is claimed is:

1. A method for executing a remote application (app) in a local device installed in a vehicle, the method comprising:
   connecting a remote device to the local device to be communicable with each other;
   transmitting information of a remote app installed in the remote device from the remote device to the local device;
   displaying simultaneously the information of the remote app received from the remote device together with information of at least one local app installed in the local device on a screen of a user interface (UI) via a display device of the local device; and
   when a user executes the remote app using the information of the remote app displayed via the display device of the local device, executing the remote app on the remote device and simultaneously displaying an execution screen of the remote app currently being executed transmitted from the remote device to the local device together with at least one execution screen of at least one local app currently being executed on the screen via the display device of the local device,
   wherein the simultaneous displaying of the execution screen of the remote app currently being executed together with the at least one execution screen of the at least one local app currently being executed comprises displaying the execution screen of the remote app on an area of the screen separate from an area of the screen on which the at least one execution screen of the at least one local app is displayed.

2. The method of claim 1, wherein when the local app and the remote app are currently being executed in a multitasking state, the local device allows for information of the local app and the remote app to be provided and displayed as a separate screen of a multitasking switching UI on the screen of the UI, and
   when the user selects any one of the apps currently being executed, which are displayed on the screen of the multitasking switching UI, the local device allows for an execution screen of the selected app to be magnified and displayed via the display device of the local device.

3. The method of claim 1, wherein the information of the remote app or the information of the local app is an execution icon for executing a corresponding app.

4. The method of claim 3, wherein the local device processes an execution icon of the remote app and displays the processed execution icon via the display device of the local device enabling the user to identify the execution icon of the remote app received from the remote device from that of the local app.

5. The method of claim 4, wherein the local device displays the execution icon of the remote app received from the remote device via the display device by changing the shape or color of the execution icon of the remote app or by forming a frame around the execution icon of the remote app.

6. The method of claim 3, wherein the local device displays the execution icon of the remote app in a predetermined region on the screen of the UI of the local device enabling the user to identify the execution icon of the remote app received from the remote device from that of the local app.

7. The method of claim 1, wherein the local device is a vehicle terminal mounted in the vehicle, and the remote device is a smart device in the vehicle.

8. A system for executing a remote application (app) in a local device, the system comprising:
  a local device installed in a vehicle having at least one local app installed thereon; and
  a remote device having a remote app installed thereon, the remote device being connected to the local device such that the remote device and the local device are communicable with each other, wherein
  the remote device transmits information of the remote app to the local device,
  the local device displays simultaneously the information of the remote app received from the remote device together with information of the at least one local app on a screen of a user interface (UI) via a display device of the local device,
  when a user executes the remote app using the information of the remote app displayed via the display device of the local device, the remote device executes the remote app and, at the same time, the local device simultaneously displays an execution screen of the remote app currently being executed transmitted from the remote device to the local device together with at least one execution screen of at least one local app currently being executed on the screen via the display device of the local device, and
  the local device displays the execution screen of the remote app on an area of the screen separate from an area of the screen on which the at least one execution screen of the at least one local app is displayed.

* * * * *